United States Patent [19]
Scott

[11] Patent Number: 5,262,027
[45] Date of Patent: Nov. 16, 1993

[54] METHOD OF USING AN ELECTRIC FIELD CONTROLLED EMULSION PHASE CONTACTOR

[75] Inventor: Timothy C. Scott, Knoxville, Tenn.

[73] Assignee: Martin Marietta Energy Systems, Inc., Oak Ridge, Tenn.

[21] Appl. No.: 674,811

[22] Filed: Mar. 22, 1991

[51] Int. Cl.$^5$ ............................................. B03C 5/00
[52] U.S. Cl. .................................. 204/186; 204/191; 204/305
[58] Field of Search ..................... 204/186, 188–191, 204/302, 304–308

[56] References Cited

U.S. PATENT DOCUMENTS

| | | | |
|---|---|---|---|
| 3,772,180 | 11/1973 | Prestridge | 204/305 |
| 3,847,775 | 11/1974 | Prestridge | 204/191 |
| 4,126,537 | 11/1978 | Prestridge | 204/302 |
| 4,161,439 | 7/1979 | Warren et al. | 204/306 |
| 4,204,934 | 5/1980 | Warren et al. | 204/186 |
| 4,308,127 | 12/1981 | Prestridge et al. | 204/302 |
| 4,400,253 | 8/1983 | Prestridge et al. | 204/186 |
| 4,606,801 | 8/1986 | Prestridge et al. | 204/186 |
| 4,702,815 | 10/1987 | Prestridge et al. | 204/302 |
| 4,722,787 | 2/1988 | Fombarlet et al. | 210/209 |
| 4,747,921 | 5/1988 | Bailes et al. | 204/186 |
| 4,767,515 | 8/1988 | Scott | 204/186 |
| 4,941,959 | 7/1990 | Scott | 204/186 |
| 5,122,360 | 6/1992 | Harris et al. | 423/592 |

OTHER PUBLICATIONS

NATCO Engineering Report No. 143, Nov. 1986.
K. W. Warren, "Crude Oil Desalting by Counterflow Electrostatic Mixing," Mar. 20, 1988, NPRA Annual Meeting, San Antonio, Tex.
ORNL-6596, *Chemical Technology Div. Progress Report for period Jul. 1, 1988 to Sep. 30, 1989*, pp. 127–128, Actual date of Publication—Apr. 4, 1990.
G. Zhongmao, "Electrostatic Pseudo Liquid Membrane Separation Technology," *Journal of Chemical Industry and Engineering* (China), vol. 5, No. 1, 1990, pp. 45–55.

*Primary Examiner*—John Niebling
*Assistant Examiner*—William T. Leader
*Attorney, Agent, or Firm*—Joseph A. Marasco; Harold W. Adams

[57] ABSTRACT

A system for contacting liquid phases comprising a column for transporting a liquid phase contacting system, the column having upper and lower regions. The upper region has a nozzle for introducing a dispersed phase and means for applying thereto a vertically oriented high intensity pulsed electric field. This electric field allows improved flow rates while shattering the dispersed phase into many micro-droplets upon exiting the nozzle to form a dispersion within a continuous phase. The lower region employs means for applying to the dispersed phase a horizontally oriented high intensity pulsed electric field so that the dispersed phase undergoes continuous coalescence and redispersion while being urged from side to side as it progresses through the system, increasing greatly the mass transfer opportunity.

13 Claims, 4 Drawing Sheets

METHOD OF USING AN ELECTRIC FIELD CONTROLLED EMULSION PHASE CONTACTOR

The United States Government has rights in this invention pursuant to contract no. DE-AC05-84OR21400 between the United States Department of Energy and Martin Marietta Energy Systems, Inc.

FIELD OF THE INVENTION

The present invention relates to methods and systems for contacting liquid phases, and more particularly to methods and systems for electric field controlled solvent extraction.

BACKGROUND OF THE INVENTION

Electric field controlled systems for contacting liquid phases, especially solvent extraction systems, efficiently create and control mass transfer surface area, and are presently under development in order to replace conventional, mechanically agitated systems. Examples of this development are found in U.S. Pat. No. 4,767,515, entitled "SURFACE AREA GENERATION AND DROPLET SIZE CONTROL IN SOLVENT EXTRACTION SYSTEMS UTILIZING HIGH INTENSITY ELECTRIC FIELDS", and also in U.S. Pat. No. 4,941,959, entitled "ELECTRIC FIELD-DRIVEN, MAGNETICALLY-STABILIZED FERRO-EMULSION PHASE CONTACTOR"; the entire disclosure of each of these U.S. Patents are hereby expressly incorporated herein by reference.

In U.S. Pat. No. 4,767,515, a method and system for solvent extraction is disclosed where droplets are shattered by a high intensity electric field. These shattered droplets form a plurality of smaller droplets which have a greater combined surface area than the original droplet. Dispersion, coalescence and phase separation are accomplished in one vessel through the use of the single pulsing high intensity electric field. Electric field conditions are chosen so that simultaneous dispersion and coalescence are taking place in the emulsion formed in the electric field. The electric field creates a large amount of interfacial surface area for solvent extraction when the droplet is disintegrated and is capable of controlling droplet size and thus droplet stability. These operations take place in the presence of a counter-current flow of the continuous phase.

In U.S. Pat. No. 4,941,959, method and systems for interfacial surface area contact between a dispersed phase liquid and a continuous phase liquid in counter-current flow for purposes such as solvent extraction are disclosed. Initial droplets of a dispersed phase liquid material containing ferromagnetic particles functioning as a "packing" are introduced to a counter-current flow of the continuous phase. A high intensity pulsed electric field is applied so as to shatter the initial droplets into a ferromagnetic emulsion comprising many smaller daughter droplets having a greater combined total surface area than that of the initial droplets in contact with the continuous phase material. A magnetic field is applied to control the position of the ferromagnetic emulsion for enhanced coalescence of the daughter droplets into larger reformed droplets.

These systems, although they exhibit much needed improvements in the subject art, are limited in flow rate by the dropwise introduction of the dispersed phase, and in mixing and mass transfer opportunity by the short, straight flowpath of the dispersed phase through the system. There is a need for electric field controlled systems for contacting liquid phases which do not require complex equipment for effecting the desired process, and which exhibit improvements related to throughput, mixing, and mass transfer opportunity.

OBJECTS OF THE INVENTION

Accordingly, it is an object of the present invention to provide a new and improved method and system for electric field controlled liquid phase contact, especially solvent extraction, which exhibits high throughput, increased extraction process efficiency, vast mixing and mass transfer opportunity in a relatively small space, high reliability, and simplicity.

It is another object of the present invention to provide a new and improved method and system for electric field controlled liquid phase contact, especially solvent extraction, which is suitable for industrial scale processes.

Further and other objects of the present invention will become apparent from the description contained herein.

SUMMARY OF THE INVENTION

In accordance with one aspect of the present invention, the foregoing and other objects are achieved by a method for contacting liquid phases which comprises the steps of:

providing first and second liquid phases; and,
employing a vertically oriented high intensity pulsed electric field to shatter a flowing stream of the first liquid phase in the second liquid phase.

In accordance with another aspect of the present invention, a method for contacting liquid phases which comprises the following steps:

1. introducing through a nozzle a first liquid phase into a continuous second liquid phase which has applied thereto a vertically oriented high intensity pulsed electric field so that the first liquid phase is shattered into many micro-droplets upon exiting the nozzle to form a dispersion, and,
2. coalescing the dispersion to form a separate liquid phase of the first liquid phase.

In accordance with another aspect of the present invention, a method for contacting liquid phases comprises the steps of:

providing first and second liquid phases; and,
employing a horizontally oriented high intensity pulsed electric field to cause the first liquid phase to undergo continuous coalescence and redispersion in the second liquid phase.

In accordance with a further aspect of the present invention, a method for contacting liquid phases comprises the steps of:

1. introducing microdroplets of a first liquid phase into a continuous second liquid phase to form a dispersion;
2. subjecting the dispersion to a high intensity pulsed electric field so that the first liquid phase undergoes continuous coalescence and redispersion; and,
3. coalescing the dispersion to form a separate liquid phase of the first liquid phase.

In accordance with another aspect of the present invention, a system for contacting liquid phases comprises a first liquid phase and a second liquid phase, and means for applying a vertically oriented high intensity pulsed electric field to shatter a flowing stream of the first liquid phase in the second liquid phase.

In accordance with another aspect of the present invention, a system for contacting liquid phases comprises a column for transporting a liquid phase contacting system comprised of a first liquid phase and a continuous second liquid phase; introducing means for introducing a first liquid phase into the liquid phase contacting system; means for applying to the first liquid phase a vertically oriented high intensity pulsed electric field so that the first liquid phase is shattered into many micro-droplets upon exiting the introducing means to form a dispersion; and, means for coalescing the dispersion to form a separate liquid phase of the first liquid phase.

In accordance with another aspect of the present invention, a system for contacting liquid phases comprises a dispersed first liquid phase and a continuous second liquid phase, and means for subjecting the dispersion to a high intensity pulsed electric field so that the dispersed first liquid phase undergoes continuous coalescence and redispersion in the continuous second liquid phase.

In accordance with a further aspect of the present invention, a system for contacting liquid phases comprises introducing means for introducing microdroplets of a first liquid phase into a continuous second liquid phase to form a dispersion; subjecting means for subjecting the dispersion to a high intensity pulsed electric field so that the first liquid phase undergoes continuous coalescence and redispersion; and, coalescing means for coalescing the dispersion to form a separate liquid phase of the first liquid phase.

In accordance with a further aspect of the present invention, a system for contacting liquid phases comprises a column for transporting a liquid phase contacting system, the column having a first region and a second region, the liquid phase contacting system comprising a first liquid phase and a continuous second liquid phase; introducing means for introducing a first liquid phase into the first region; electric field applying means associated with the first region for applying to the first liquid phase a first, vertically oriented high intensity pulsed electric field so that the first liquid phase is shattered into many micro-droplets upon exiting the nozzle to form a dispersion; subjecting means associated with the second region for subjecting the dispersion to a second, horizontally oriented high intensity pulsed electric field so that the first liquid phase undergoes continuous coalescence and redispersion; and, coalescing means associated with the second region for coalescing the dispersion to form a separate liquid phase of the first liquid phase.

For a better understanding of the present invention, together with other and further objects, advantages and capabilities thereof, reference is made to the following disclosure and appended claims in connection with the above-described drawing.

DETAILED DESCRIPTION OF THE INVENTION

Figure 1:
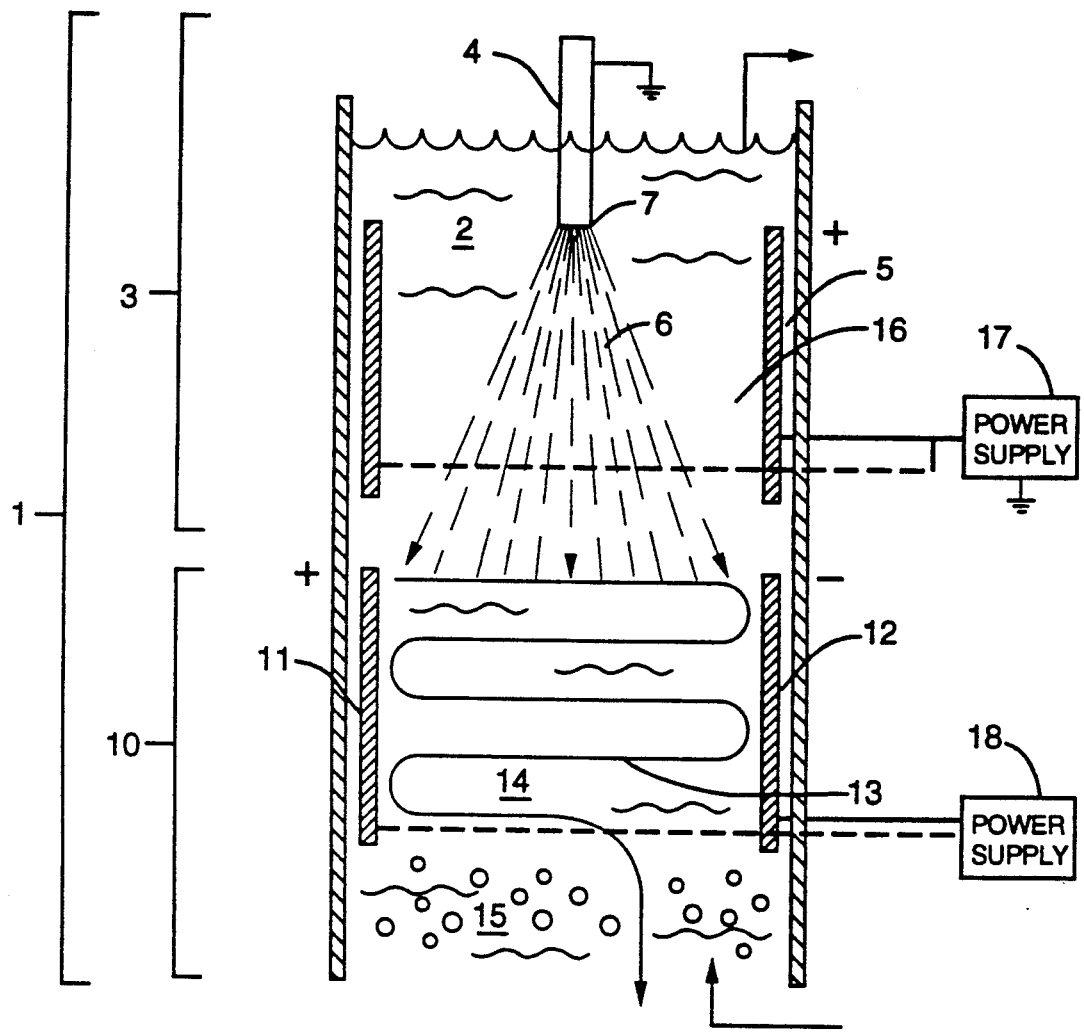
FIG. 1 shows schematically, a simple liquid phase contacting system in accordance with the present invention.

Referring in detail to the drawing and with particular reference to FIG. 1, a liquid phase contacting system 1, in accordance with the present invention, is submerged in an upflowing stream of a generally non-conducting, usually organic, continuous liquid phase 2, and is comprised of two separately controlled regions. The upper, or nozzle region 3 has a nozzle 4, which preferably serves as an electrically grounded electrode made of conducting material, and a charged electrode system 5 for generating a generally vertically oriented electric field in the dispersion channel 16, which is preferably defined by the nozzle 4 and electrode system 5. Generating a vertically oriented electric field in the dispersion channel 16 permits constant, rather than dropwise, first liquid introduction, resulting in greater first liquid phase throughput than does a horizontally oriented electric field, as described in the above referenced U.S. Patents. Various other electrode configurations, such as an electrode system surrounding and in close proximity with a nonconducting nozzle, could possibly be used to generate a suitable vertically oriented electric field, and would be considered to fall within the scope of the present invention. The vertically oriented electric field continuously induces dispersion of micron sized microdroplets of the first liquid phase 6, an aqueous, or relatively conducting liquid phase, which continuously exits the nozzle 4 through the nozzle exit 7, appearing as a spray or a jet, and proceeds through the dispersion channel 16. Although the nozzle region can be operated independently as a discreet system, it is suggested that the dispersion continue toward the lower, or operating region 10 for further processing as is next described.

The operating region 10 of the system has oppositely charged electrodes 11 and 12 for generating a usually horizontally oriented field for controlling first liquid phase motion in the region, the general pattern of motion indicated by flowpath 13. The first liquid phase is introduced as a dispersion, preferably by, but not limited to, the above described method, and is subjected to continuous and constant dispersion and coalescence in addition to a generally side-to-side motion, indicated by flowpath 13, as it passes through the operating region 10 of the system. Vast mixing and mass transfer opportunity are induced in a relatively small space. The preferred techniques for generating and controlling the forces that effect the initial dispersion and subsequent behavior of the first liquid phase will be more fully understood upon further reading herein.

Figure 2:
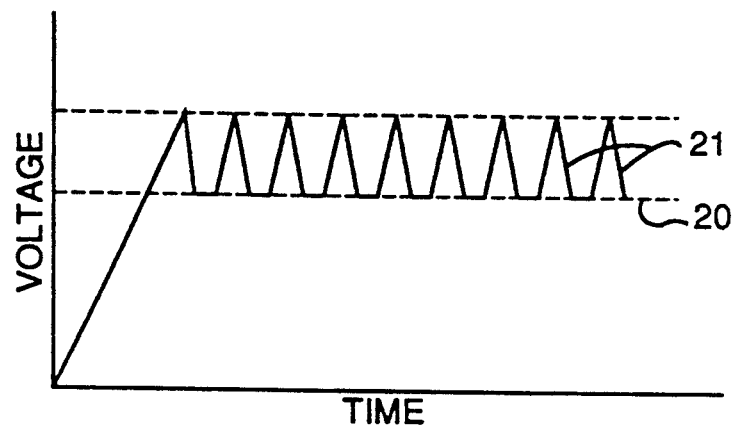
FIG. 2 is a graph showing the voltage pattern across the electrodes of a typical nozzle region in accordance with the present invention.

For the various and sundry processes that can be accomplished utilizing the subject system, each of these two regions may require different types of electric fields and electrode configurations. Separate power supplies 17 and 18 may be used for each region, or a single power supply with separate outputs (not illustrated) may be used. The nozzle region electrode 5 can be annular or an array which surrounds the nozzle exit 7 in a variety of configurations. The electric field generated to disperse the first liquid phase 6 may have a positive or a negative polarity. Electrical pulses are generated by a power supply operating on a duty cycle of about 0.1% to about 50%, preferably about 1%, to produce voltage spikes. The pulses are processed through a diode system to prevent electrical backflow between pulses, thus retaining a residual charge across the electrodes. As shown in FIG. 2, this gives the electric field a signal which has a D.C. field offset 20 with superimposed voltage spikes 21. The optimal frequency and amplitude of the pulses to obtain a given D.C. offset/spike combination is dependent upon the electrical and possibly the interactional properties of the liquid phases, and the physical size and configuration of the apparatus used for a particular process. To optimize field strengths for a particular system, it is expected that some engineering and experimentation with various parameters would be involved. Frequencies and amplitudes can be expected to vary from 10 Hz to 2000 Hz, and from ±10 KV to ±60 KV, respectively.

The operating region 10 is comprised of parallel, oppositely charged electrodes 11, 12 which form an operating channel 14 between them. The dispersed first liquid phase 6 and continuous second liquid phase 2 preferably flow countercurrently, the direction being determined by the effect of gravity. If the first liquid phase 6 is more dense than the second liquid phase 2, it will flow downwardly through the operating channel 14 in the presence of an upflowing second liquid phase 2, as illustrated in FIG. 1. If the first liquid phase 6 is less dense than the second liquid phase 2, it will flow upwardly through the operating channel 14 in the presence of an downflowing second liquid phase 2, the nozzle region 3 being below the operating region 10. A batch system utilizing a static second liquid phase is also suggested.

Figure 3:
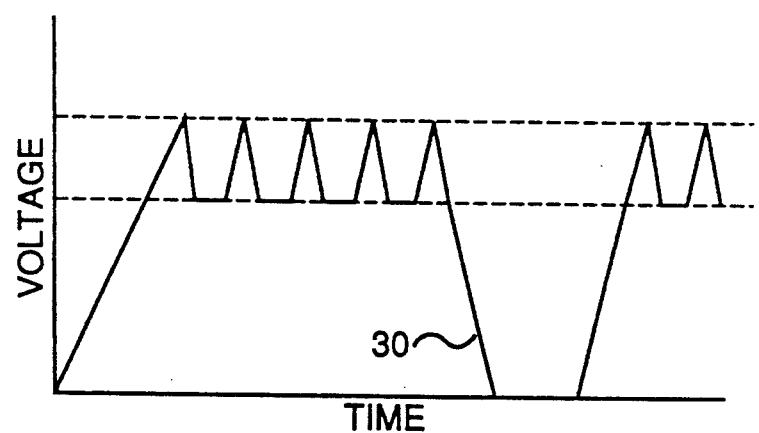
FIG. 3 is a graph showing the voltage pattern across the electrodes of a typical operating region in accordance with the present invention.

The electric field generated to control the behavior of the first liquid phase 6 in the operating channel 14 may be positive, negative, or bipolar in nature. Electrical pulses are generated by a power supply operating on a duty cycle of about 0.05% to about 50%, preferably about 0.1% to about 10%, more preferably about 0.2% to about 5%, with a specific preference of about 0.5%, to produce voltage pulses, or spikes. The pulses are processed through a diode system to prevent electrical backflow between pulses, thus retaining a residual charge across the electrodes. This gives the electric field a signal which has a D.C. field offset with superimposed voltage spikes, as shown in FIG. 2. Referring to FIG. 3, it may also be beneficial to alter the duty cycle of the D.C. offset to produce a secondary pulsing effect 30 where the D.C. offset voltage is decreased or returned to zero and then restored. This type of voltage pattern maintains large spatial and temporal voltage gradients at the electrode surfaces in order to sustain the dispersion of microdroplets near the electrode surfaces. The duty cycle of the D.C. offset should be significantly greater than the voltage spikes, and can vary from about 10% to nearly 100%, preferably from about 50% to about 99%, more preferably from about 75% to about 98%, with a specific preference of about 95%. The optimal frequency and amplitude of the pulses to obtain a given D.C. offset/spike/secondary pulse combination is dependent upon the electrical and possibly the interactional properties of the liquid phases, and the physical size and configuration of the apparatus used for a particular process. To optimize a particular system, it is expected that some engineering and experimentation with various parameters would be involved. Frequencies and amplitudes can be expected to vary from 10 Hz to 2000 Hz, and from ±10 KV to ±60 KV, respectively.

Under the influence of the electric field in the operating channel 14, the dispersion undergoes constant and continuous partial coalescence and redispersion and is forced from side to side as it progresses through the operating channel 14, increasing first liquid phase holdup and creating vast amounts of surface area and mass transfer opportunity. The side-to-side motion of the first liquid phase 6 is effected by static charges acquired by first liquid phase microdroplets as they come in close proximity to an electrode 11 or 12. The charged microdroplets are repelled by the electrode 11 or 12 from which they received the charge, and are attracted to the oppositely charged electrode 11 or 12 across the operating channel 14, where the charge on the microdroplets is reversed, and the cycle repeats itself until the first liquid phase reaches the end 15 of the operating channel 14. At that point, the dispersion coalesces and is removed from the system as described in above the referenced U.S. Pat. Nos. 4,767,515, and 4,941,959. The length of the operating region is a factor in determining dispersion holdup in the system and is established by the length of the electrodes 11 and 12. Systems that require a relatively high dispersion holdup would benefit from a longer operating region. Likewise, systems that do not require a high dispersion holdup would benefit from a shorter operating region.

Figure 4:
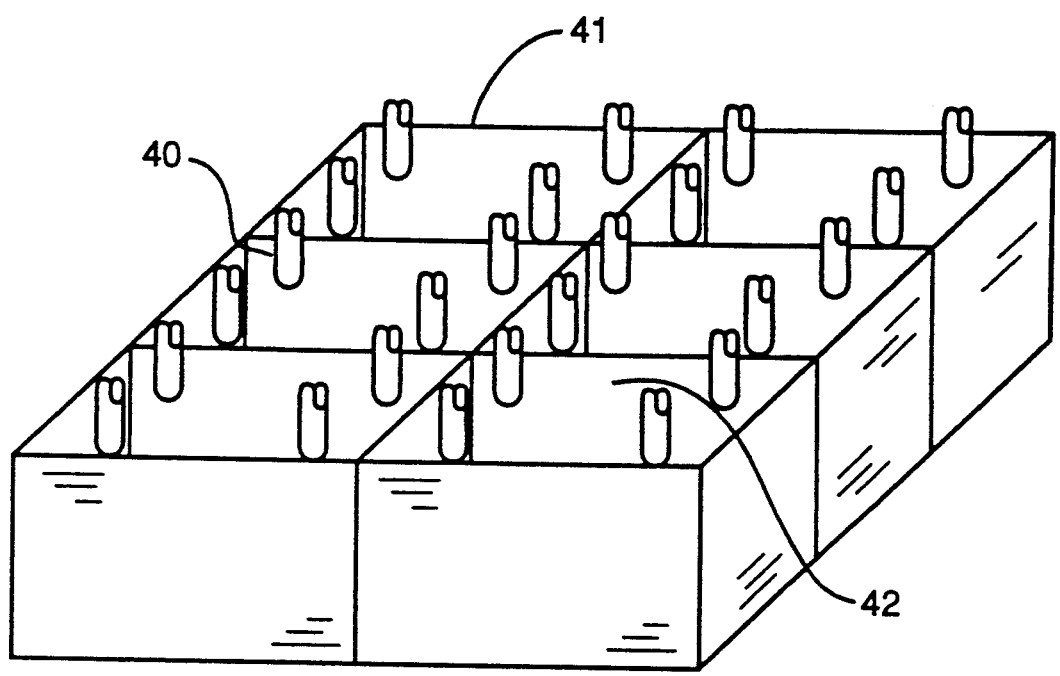
FIG. 4 shows schematically, the nozzle region of a multiple channel liquid phase contacting system in accordance with the present invention.
Figure 5:
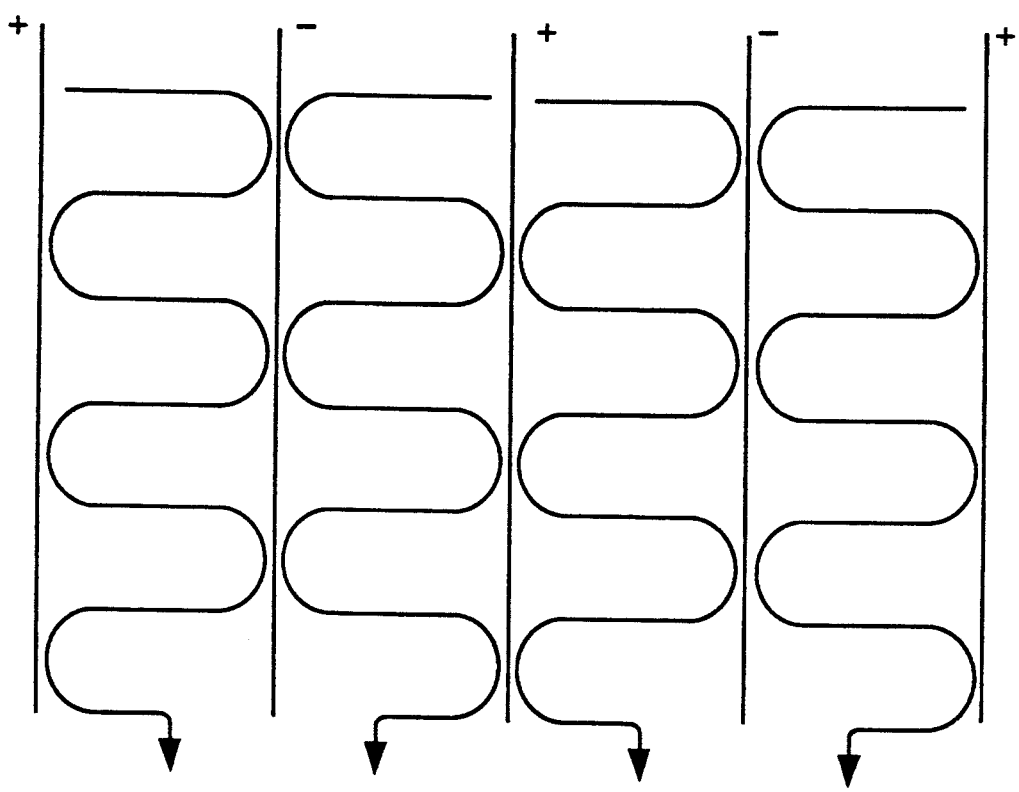
FIG. 5 shows schematically, the operating region of a multiple channel liquid phase contacting system in accordance with the present invention.

Referring now to FIGS. 4 and 5, another embodiment of the present invention comprises gridlike arrays of nozzles and electrodes which from individual subsystem within a flowing continuous liquid phase. The nozzle region is comprised of an array of preferably electrically grounded nozzles 40 and a charged electrode grid 41. The electrode grid 41 defines box shaped dispersion regions 42, each of which has at least one nozzle 40, and preferably four, with one near each corner as shown in FIG. 4. The operating region has oppositely charged electrode pairs below each dispersion region; a convenient configuration is illustrated in FIG. 5.

EXAMPLE I

A system for contacting liquid phases is constructed in accordance with the invention. An array of four electrically grounded nozzles having exits 0.1" in diameter is disposed 0.05" into the open end of a square tubular electrode about 3.5" in diameter and 1" in length; each nozzle is disposed near a corner of the electrode, as shown in FIG. 4. Above the nozzle array is means for drawing off a lighter, organic second liquid phase. A pair of parallel plate electrodes are disposed 3.5" apart in an operating region 12" in length, below which is conventional means for drawing off a heavier, aqueous first liquid phase and for introducing the second liquid phase. The nozzle region is supplied with an electric field having a voltage pulse frequency of about 500 Hz, with a duty cycle of about 0.5% and an amplitude of about 30 to 40 KV; a D.C. offset of about 25 KV at a 100% duty cycle is maintained. The operating region is supplied by oppositely charged electrodes with an electric field having a primary pulse frequency of about 500 Hz with a duty cycle of about 0.5% and an amplitude of about 30 to 40 KV; a D.C. offset of about 25 KV at a 95% duty cycle is maintained.

EXAMPLE II

Using the apparatus described in Example I, and in accordance with the present invention, an organic second liquid phase comprising 40% versatic acid in kerosene is introduced at a rate of 75 cc/min into the bottom of the operating channel and flows upward through the operating channel, through the dispersion region, and thence out of the apparatus. A first liquid phase comprising 3 g/l copper acetate in aqueous solution with 0.1 molar sodium acetate and $1\times 10^{-4}$ molar acetic acid is introduced at a rate of 5 cc/min through the nozzle array, is dispersed into many microdroplets in the dispersion region, moves downwardly through the operating channel as a dispersion in the manner described herein, coalesces at the bottom of the operating channel, and is drawn off from the apparatus. 50.4% of the $Cu^{2+}$ component of the first liquid phase is transferred to the second liquid phase, indicating that in a once through, continuous operation, performance efficiency equivalent to about four ideal stages of conventional liquid phase contacting systems is achieved.

While there has been shown and described what are at present considered the preferred embodiments of the invention, it will be obvious to those skilled in the art that various changes and modifications can be made therein without departing from the scope of the inventions defined by the appended claims.

What is claimed is:

1. A method for contacting liquid phases comprising the steps of:
    introducing through a nozzle a first liquid phase into a continuous second liquid phase;
    applying a generally vertically oriented pulsed electric field to said first liquid phase upon exiting said nozzle, said pulsed electric field having a D.C. offset with superimposed voltage spikes, said pulsed electric field being of sufficiently high intensity to shatter said first liquid phase into many micro droplets to form a dispersion;
    subjecting said dispersion is to a further pulsed electric field to cause said first liquid phase to undergo continuous coalescence and redispersion; and,
    coalescing said dispersion to form a separate liquid phase of said first liquid phase.

2. The method of claim 1 wherein said pulsed electric field operates at a duty cycle in the range of about 0.05% to about 50%.

3. The method of claim 2 wherein said pulsed electric field operates at a duty cycle of about 0.5%.

4. The method of claim 1 wherein said further pulsed electric field operates at a duty cycle in the range of about 0.05% to about 50%.

5. The method of claim 4 wherein said further pulsed electric field operates at a duty cycle of about 0.5%.

6. The method of claim 1 wherein said further pulsed electric field has a D.C. offset with superimposed voltage spikes.

7. The method of claim 6 wherein said D.C. offset operates at a duty cycle in the range of about 10% to about 100%.

8. The method of claim 7 wherein said D.C. offset operates at a duty cycle of about 95%.

9. The method of claim 1 wherein said pulsed electric field is generated by a charged electrode disposed in proximity with said nozzle, said nozzle being electrically grounded.

10. A method for contacting liquid phases comprising the steps of:
    dispersing a first liquid phase into a continuous second liquid phase to form a dispersion;
    subjecting said dispersion to a pulsed electric field to cause said first liquid phase to undergo continuous coalescence and redispersion, said pulsed electric field operating at a duty cycle in the range of about 0.05% to about 50%, said pulsed electric field having a D.C. offset with superimposed voltage spikes; and,
    coalescing said dispersion to form a separate liquid phase of said first liquid phase.

11. The method of claim 10 wherein said pulsed electric field operates at a duty cycle of about 0.5%.

12. The method of claim 10 wherein said D.C. offset operates at a duty cycle in the range of about 10% to about 100%.

13. The method of claim 12 wherein said D.C. offset operates at a duty cycle of about 95%.

* * * * *